US 8,843,262 B2

(12) United States Patent
Fushiki

(10) Patent No.: US 8,843,262 B2
(45) Date of Patent: Sep. 23, 2014

(54) VEHICLE, METHOD FOR CONTROLLING VEHICLE, AND DEVICE FOR CONTROLLING VEHICLE

(75) Inventor: Shunsuke Fushiki, Susono (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 0 days.

(21) Appl. No.: 13/996,885

(22) PCT Filed: Dec. 22, 2010

(86) PCT No.: PCT/JP2010/073084
§ 371 (c)(1),
(2), (4) Date: Jun. 21, 2013

(87) PCT Pub. No.: WO2012/086021
PCT Pub. Date: Jun. 28, 2012

(65) Prior Publication Data
US 2013/0297138 A1 Nov. 7, 2013

(51) Int. Cl.
*B60L 9/00* (2006.01)
*B60W 10/06* (2006.01)
*B60W 20/00* (2006.01)
*B60W 10/08* (2006.01)
*B60K 6/445* (2007.10)
*B60W 30/194* (2012.01)

(52) U.S. Cl.
CPC ............ *B60W 20/108* (2013.01); *B60W 10/06* (2013.01); *B60W 2510/0676* (2013.01); *Y02T 10/6286* (2013.01); *B60W 20/00* (2013.01); *B60W 10/08* (2013.01); *B60K 6/445* (2013.01); *B60W 30/194* (2013.01); *Y02T 10/6239* (2013.01); *Y10S 903/93* (2013.01)
USPC ............................................ 701/22; 903/930

(58) Field of Classification Search
None
See application file for complete search history.

(56) References Cited

U.S. PATENT DOCUMENTS

| | | | |
|---|---|---|---|
| 6,223,106 B1 * | 4/2001 | Yano et al. ...................... 701/22 |
| 6,260,535 B1 | 7/2001 | Froeschl et al. | |
| 2002/0014869 A1 * | 2/2002 | Omata et al. .................... 318/139 |
| 2002/0123831 A1 | 9/2002 | Nakagawa et al. | |
| 2003/0073540 A1 * | 4/2003 | Eguchi et al. .................. 477/110 |
| 2005/0235938 A1 * | 10/2005 | Tani et al. .................. 123/90.17 |
| 2013/0190962 A1 * | 7/2013 | Yokouchi et al. ............... 701/22 |

FOREIGN PATENT DOCUMENTS

| | | |
|---|---|---|
| JP | 2000265880 A | 9/2000 |
| JP | 2002188481 A | 7/2002 |
| JP | 2002256919 A | 9/2002 |
| JP | 2004019519 A | 1/2004 |
| JP | 2004-218600 A | 8/2004 |
| JP | 2005127199 A | 5/2005 |
| JP | 2008080914 A | 4/2008 |
| JP | 2010007532 A | 1/2010 |
| JP | 2010241396 A | 10/2010 |
| JP | 2010-247644 A | 11/2010 |

* cited by examiner

*Primary Examiner* — Thomas Tarcza
*Assistant Examiner* — Adam Alharbi
(74) *Attorney, Agent, or Firm* — Kenyon & Kenyon LLP

(57) ABSTRACT

A plug-in hybrid vehicle includes: an engine; a motor generator coupled to an output shaft of the engine; and an ECU that causes rotation of the output shaft of the engine by driving the motor generator, when a temperature of coolant of the engine is equal to or smaller than a predetermined threshold value after suspending ignition and supply of fuel to the engine.

13 Claims, 11 Drawing Sheets

F I G. 10
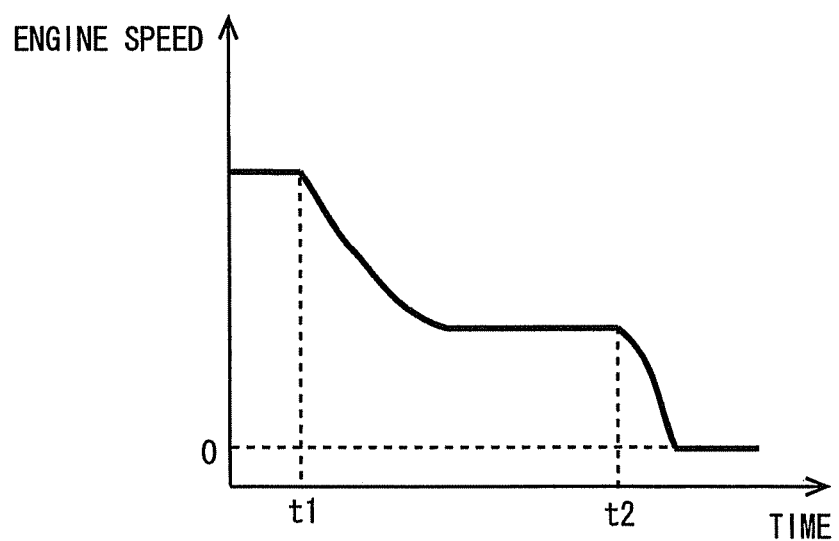

VEHICLE, METHOD FOR CONTROLLING VEHICLE, AND DEVICE FOR CONTROLLING VEHICLE

This is a 371 national phase application of PCT/JP2010/073084 filed 22 Dec. 2010, the contents of which are incorporated herein by reference.

TECHNICAL FIELD

The present invention relates to a vehicle, a method for controlling the vehicle, and a device for controlling the vehicle, in particular, a technique of rotating an output shaft of an internal combustion engine using an electric motor after suspending ignition and supply of fuel to the internal combustion engine.

BACKGROUND ART

A hybrid vehicle having an engine and a motor as a driving source has been known. Such a hybrid vehicle is provided with a power storage device, such as a battery, to store electric power to be supplied to the motor. The battery is charged with electric power generated by a power generator driven by the engine, electric power regenerated using the motor during deceleration of the vehicle, and the like.

Such a hybrid vehicle can travel by using, as the driving source, one or both of the engine and the motor in accordance with a traveling condition of the vehicle or the like. Hence, for example, when the accelerator position is small, the vehicle can travel using only the motor as the driving source with the engine being stopped. Meanwhile, when abrupt acceleration is required, the engine is driven in order to achieve desired acceleration.

In the traveling state in which only the motor is used as the driving source with the engine being stopped, no exhaust gas is emitted, thus achieving small load on environment. However, as described above, in the hybrid vehicle, the stop and start of the engine may be repeated. As a result, the engine may be stopped before completing warming-up of the engine. Accordingly, the engine may be frequently restarted when the warming-up is not completed. As known well, if the engine is started when the warming-up is not completed, a relatively large amount of HC or CO may be emitted.

In order to solve such a problem, each of Japanese Patent Laying-Open No. 2002-256919 (PTL 1), Japanese Patent Laying-Open No. 2002-188481 (PTL 2), and Japanese Patent Laying-Open No. 2010-7532 (PTL 3) discloses to scavenge an exhaust passage or the like by motoring the engine using an electric motor or a starter motor with the engine being stopped.

CITATION LIST

Patent Literature

PTL 1: Japanese Patent Laying-Open No. 2002-256919
PTL 2: Japanese Patent Laying-Open No. 2002-188481
PTL 3: Japanese Patent Laying-Open No. 2010-7532

SUMMARY OF INVENTION

Technical Problem

However, electric power stored in the battery or the like is consumed by motoring the internal combustion engine (engine) using the electric motor or the starter motor. Accordingly, electric power for travelling may be reduced.

The present invention has been made to reduce electric power consumed to motor the internal combustion engine.

Solution to Problem

A vehicle includes: an internal combustion engine; an electric motor coupled to an output shaft of the internal combustion engine; a control unit that suspends ignition and supply of fuel to the internal combustion engine, and that thereafter causes rotation of the output shaft of the internal combustion engine by driving the electric motor when a temperature of coolant of the internal combustion engine is equal to or smaller than a predetermined threshold value.

A method for controlling a vehicle equipped with an internal combustion engine and an electric motor coupled to an output shaft of the internal combustion engine includes the steps of: suspending ignition and supply of fuel to the internal combustion engine; and rotating the output shaft of the internal combustion engine by driving the electric motor, when a temperature of coolant of the internal combustion engine is equal to or smaller than a predetermined threshold value after suspending the ignition and supply of fuel to the internal combustion engine.

A device for controlling a vehicle equipped with an internal combustion engine and an electric motor coupled to an output shaft of the internal combustion engine includes: means for suspending ignition and supply of fuel to the internal combustion engine; and means for rotating the output shaft of the internal combustion engine by driving the electric motor, when a temperature of coolant of the internal combustion engine is equal to or smaller than a predetermined threshold value after suspending the ignition and supply of fuel to the internal combustion engine.

Advantageous Effects of Invention

When the temperature of the coolant of the internal combustion engine is equal to or smaller than the predetermined threshold value after suspending the ignition and supply of fuel to the internal combustion engine, the output shaft of the internal combustion engine is rotated by the electric motor in order to scavenge the combustion chamber of the internal combustion engine or the like. Accordingly, when warming-up of the internal combustion engine is completed, the electric motor is not driven. Hence, unnecessary driving of the electric motor is restricted. As a result, electric power consumed to motor the internal combustion engine can be reduced.

BRIEF DESCRIPTION OF DRAWINGS

FIG. 10 is a timing chart showing an engine speed.

DESCRIPTION OF EMBODIMENTS

Figure 1:
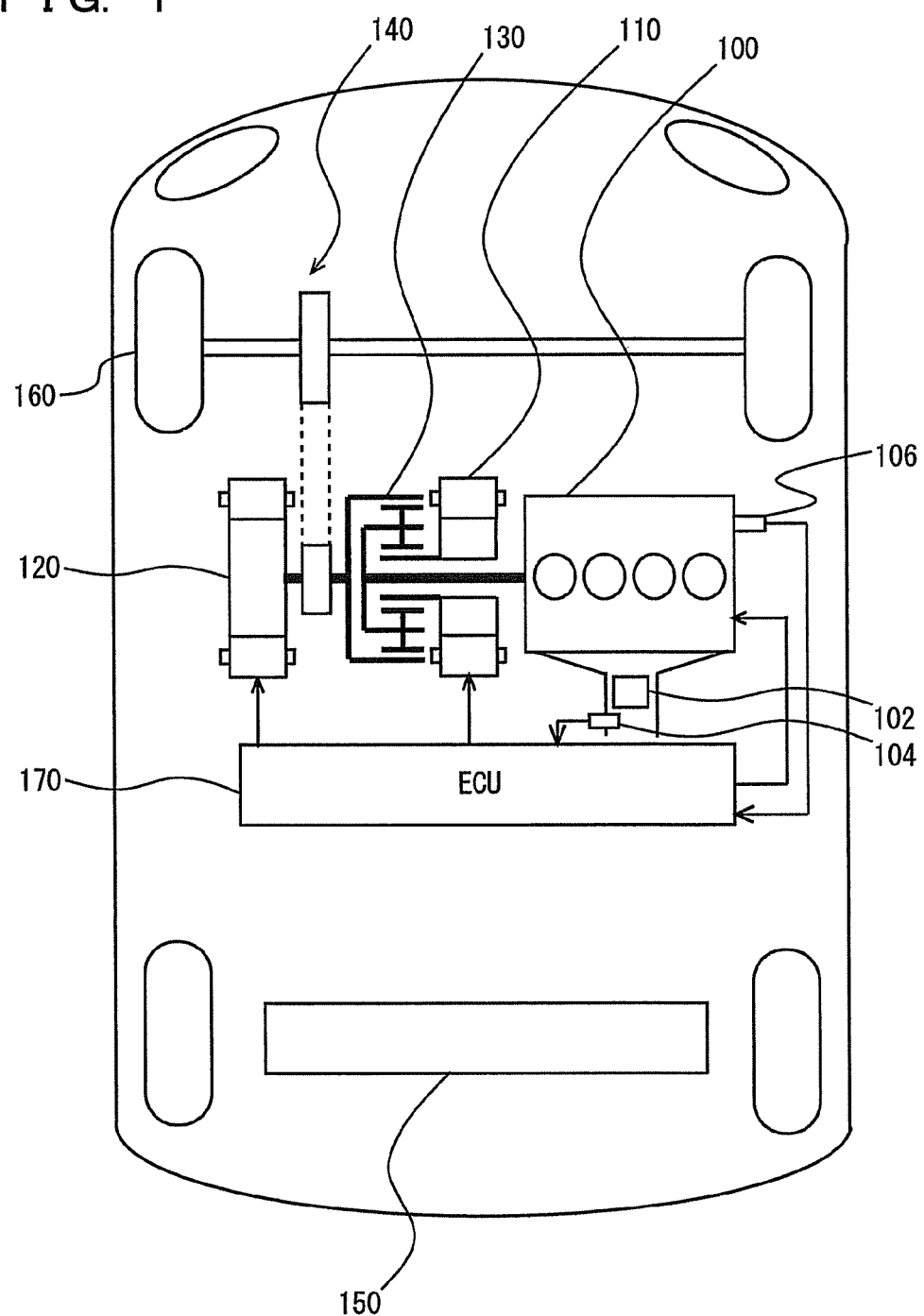
FIG. 1 is a schematic configuration diagram showing a plug-in hybrid vehicle.

In the following, an embodiment of the present invention will be described with reference to figures. In the following description, the same parts are denoted with the same reference numerals. Their designations and functions are also the same. Therefore, a detailed description thereof will not be repeated.

Referring to FIG. 1, a plug-in hybrid vehicle is equipped with an engine 100, a first motor generator 110, a second motor generator 120, a power split device 130, a speed reducer 140, and a battery 150. It should be noted that the plug-in hybrid vehicle will be described in the following description by way of example, but a hybrid vehicle having no function of charging from an external power source may be employed instead of the plug-in hybrid vehicle.

Engine 100, first motor generator 110, second motor generator 120, and battery 150 are controlled by an ECU (Electronic Control Unit) 170. ECU 170 may be divided into a plurality of ECUs.

This vehicle travels using a driving force from at least one of engine 100 and second motor generator 120. More specifically, either one or both of engine 100 and second motor generator 120 are automatically selected as a driving source in accordance with a traveling state.

For example, when the accelerator position is small and the vehicle speed is low, the plug-in hybrid vehicle travels using only second motor generator 120 as a driving source. In this case, engine 100 is stopped. However, engine 100 is sometimes driven for power generation or the like.

On the other hand, when the accelerator position is large, when the vehicle speed is high, or when the state of charge (SOC) of battery 150 is small, engine 100 is driven. In this case, the plug-in hybrid vehicle travels on only engine 100 or both of engine 100 and second motor generator 120 as a driving source.

Further, this vehicle travels while automatically switching between a CS (Charge Sustaining) mode and a CD (Charge Depleting) mode, for example. It should be noted that the CS mode and the CD mode may be manually switched.

In the CS mode, the plug-in hybrid vehicle travels while maintaining electric power, which is stored in battery 150, at a predetermined target value.

In the CD mode, without maintaining the electric power stored in battery 150 for traveling, the plug-in hybrid vehicle travels using electric power, mainly using driving force only from second motor generator 120. In the CD mode, when the accelerator position is large and the vehicle speed is high, engine 100 can be driven to supplement the driving force.

The CS mode may be also referred to as "HV mode". Similarly, the CD mode may be also described as "EV mode". It should be noted that details of the CS mode and the CD mode will be described later.

Engine 100 is an internal combustion engine. An air-fuel mixture is combusted in a combustion chamber to rotate a crank shaft serving as an output shaft. Exhaust gas emitted from engine 100 is cleaned by a catalyst 102 and thereafter emitted to the outside of the vehicle. Catalyst 102 performs a cleaning function when warmed up to a specific temperature.

Catalyst 102 is warmed up by heat of the exhaust gas. Catalyst 102 is, for example, a three-way catalyst.

From the exhaust gas, an air-fuel ratio sensor 104 detects an air-fuel ratio of engine 100. Further, a temperature sensor 106 detects a temperature of coolant of engine 100. The output of air-fuel ratio sensor 104 and the output of temperature sensor 106 are sent to ECU 170.

Figure 2:
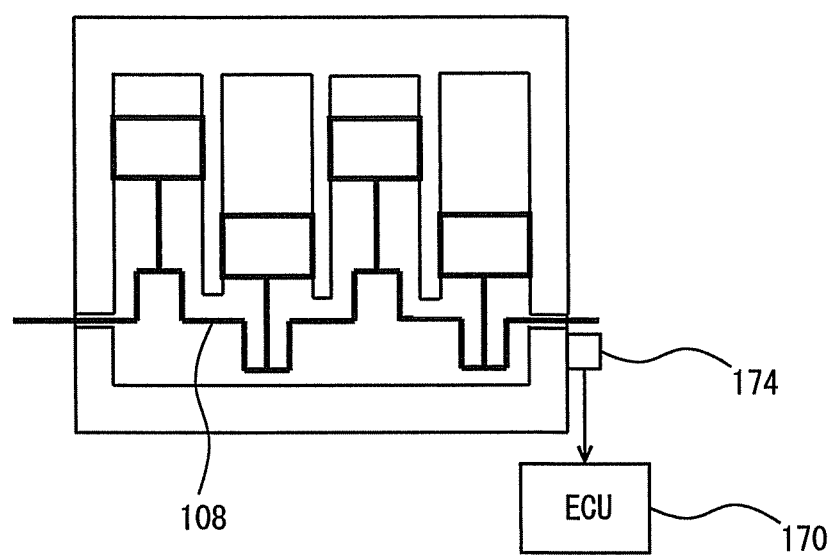
FIG. 2 is a schematic configuration diagram showing an engine.

Referring to FIG. 2, each of cylinders in engine 100 is provided with an intake valve (not shown), an exhaust valve (not shown), a piston, an ignition plug (not shown), and an injector (not shown). Each piston is coupled to the crankshaft, which is output shaft 108, via a connecting rod. Therefore, by rotating the crankshaft, each piston is moved up and down. Fuel is injected by the injector to each of the cylinders.

When the piston is moved down with the intake valve opened and the exhaust valve closed, air enters via the intake valve (intake stroke). When the piston is moved up with the intake valve and the exhaust valve closed, the air is compressed (compression stroke). When an air-fuel mixture is ignited using an ignition plug or the like, the air-fuel mixture is combusted and expanded. As a result, the piston is moved down (combustion stroke or expansion stroke). As a result, the crankshaft is rotated. Thereafter, the exhaust valve is opened and the piston is moved up, thereby exhausting exhaust gas (exhaust stroke). The cylinders are ignited in a predetermined order.

The rotational speed (angular speed) of engine 100 is detected by a rotational speed sensor (crank position sensor) 174, and a signal indicating a result of the detection is sent to ECU 170. As known well, engine speed NE, i.e., rotational speed of output shaft 108 per minute, is determined from rotational speed of engine 100.

Turning back to FIG. 1, engine 100, first motor generator 110, and second motor generator 120 are connected to one another via power split device 130. Motive power generated by engine 100 is split into two paths by power split device 130. One of the paths is a path for driving front wheels 160 via speed reducer 140. The other is a path for driving first motor generator 110 for electric power generation.

First motor generator 110 is a three-phase alternating current rotating electric machine including a U-phase coil, a V-phase coil, and a W-phase coil. First motor generator 110 generates electric power using the motive power of engine 100 that is split by power split device 130. The electric power generated by first motor generator 110 is used depending on the traveling state of the vehicle and a state of charge of battery 150. For example, in the normal traveling, electric power generated by first motor generator 110 is directly used as electric power for driving second motor generator 120. On the other hand, when the SOC of battery 150 is lower than a predetermined value, electric power generated by first motor generator 110 is converted from alternating current to direct current by an inverter described later. Thereafter, the voltage is adjusted by a converter described later and then stored in battery 150.

When first motor generator 110 acts as a power generator, first motor generator 110 generates negative torque. Here, the negative torque refers to such torque that becomes a load on engine 100. When first motor generator 110 receives power supply and acts as a motor, first motor generator 110 generates positive torque. Here, the positive torque refers to such torque that does not become a load on engine 100, that is, such torque that assists in rotation of engine 100. The same is applicable to second motor generator 120.

Second motor generator 120 is a three-phase alternating current rotating electric machine including a U-phase coil, a V-phase coil, and a W-phase coil. Second motor generator 120 is driven using at least one of electric power stored in battery 150 and electric power generated by first motor generator 110.

Driving force of second motor generator 120 is transmitted to front wheels 160 through speed reducer 140. Accordingly, second motor generator 120 assists engine 100 or allows the vehicle to travel with the driving force from second motor generator 120. The rear wheels may be driven in place of or in addition to front wheels 160.

At the time of regenerative braking of the plug-in hybrid vehicle, second motor generator 120 is driven by front wheels 160 through speed reducer 140, so that second motor generator 120 operates as a power generator. Thus, second motor generator 120 operates as a regenerative brake which converts braking energy into electric power. This electric power generated by second motor generator 120 is stored in battery 150.

Power split device 130 is formed of a planetary gear including a sun gear, pinion gears, a carrier, and a ring gear. The pinion gears are engaged with the sun gear and the ring gear. The carrier supports the pinion gears such that they are rotatable on their own axes. The sun gear is coupled to the rotation shaft of first motor generator 110. The carrier is coupled to the crankshaft of engine 100. The ring gear is coupled to a rotation shaft of second motor generator 120 and speed reducer 140.

Figure 3:
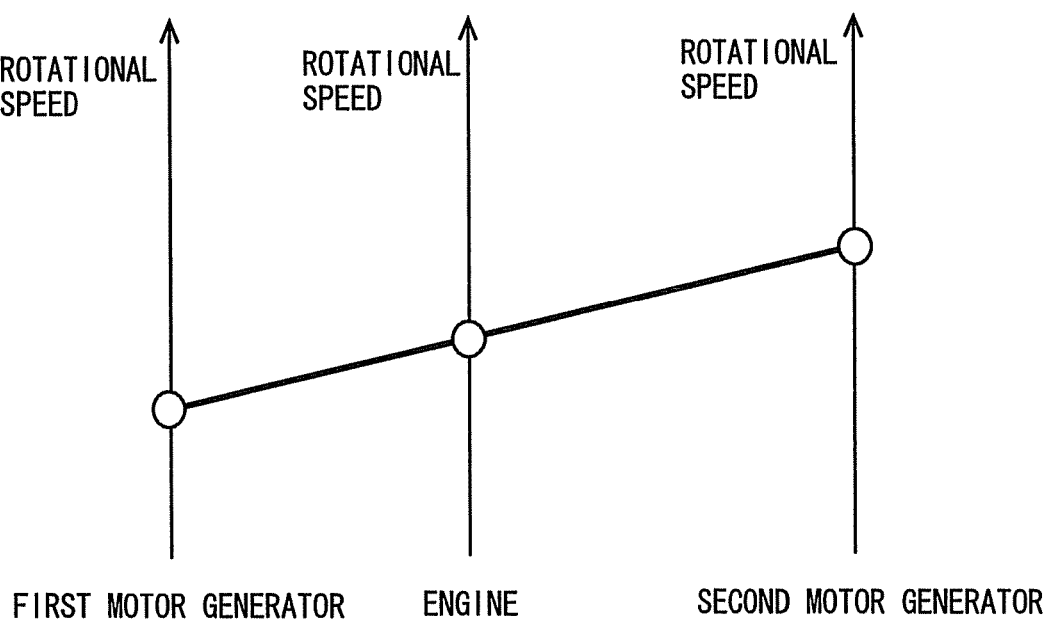
FIG. 3 is a first diagram showing a nomographic chart of a power split device.

Engine 100, first motor generator 110, and second motor generator 120 are coupled to one another via power split device 130 formed of the planetary gear. Accordingly, the rotational speeds of engine 100, first motor generator 110, and second motor generator 120 have a relation represented by a straight line in a nomographic chart as shown in FIG. 3.

Figure 4:
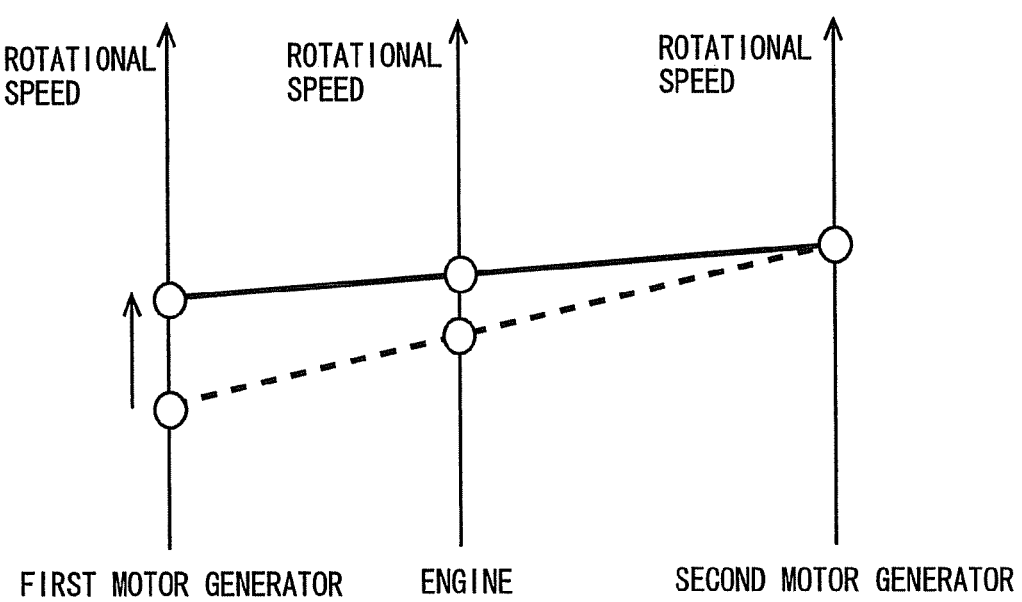
FIG. 4 is a second diagram showing a nomographic chart of the power split device.
Figure 5:
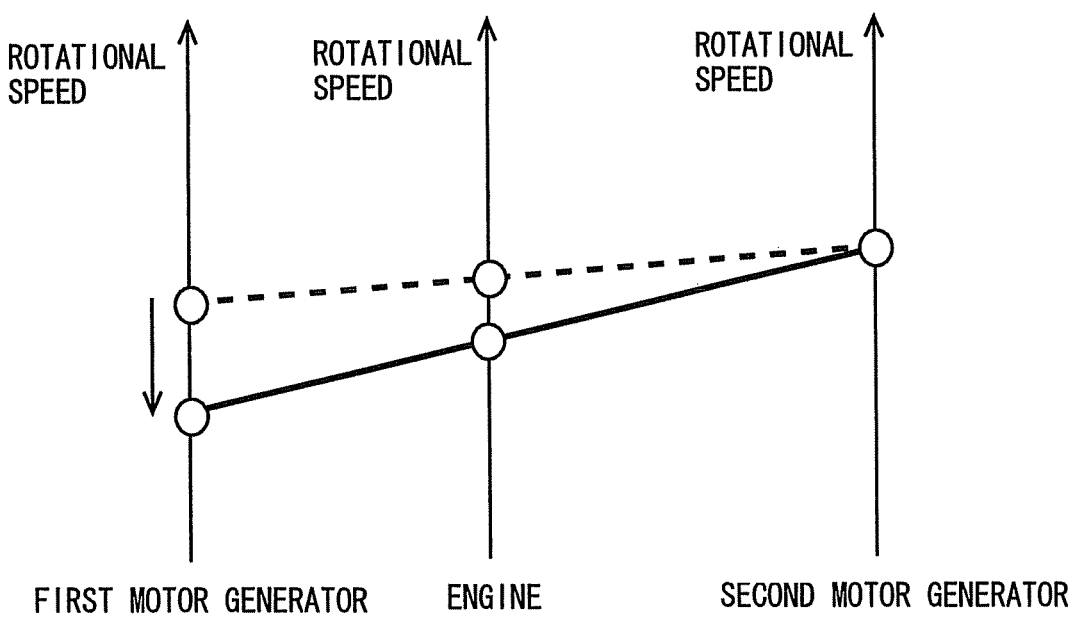
FIG. 5 is a third diagram showing a nomographic chart of the power split device.

Therefore, in the present embodiment, first motor generator 110 can be driven to rotate output shaft 108 of engine 100 with ignition and supply of fuel (fuel injection) in engine 100 being suspended and with the rotational speed of second motor generator 120, i.e., the vehicle speed being maintained. For example, as shown in FIG. 4, when starting engine 100, in order to crank engine 100 while maintaining the rotational speed of second motor generator 120, i.e., the vehicle speed, first motor generator 110 can be driven to increase the rotational speed of first motor generator 110 and engine speed NE. Conversely, as shown in FIG. 5, the rotational speed of first motor generator 110 and engine speed NE can be decreased while maintaining the rotational speed of second motor generator 120, i.e., the vehicle speed.

Turning back to FIG. 1, battery 150 is a battery pack configured such that a plurality of battery modules, each formed by integrating a plurality of battery cells, are connected in series. The voltage of battery 150 is, for example, about 200 V. Battery 150 is charged with electric power supplied from first motor generator 110 and second motor generator 120 as well as a power source external to the vehicle. A capacitor may be used in place of or in addition to battery 150.

Figure 6:
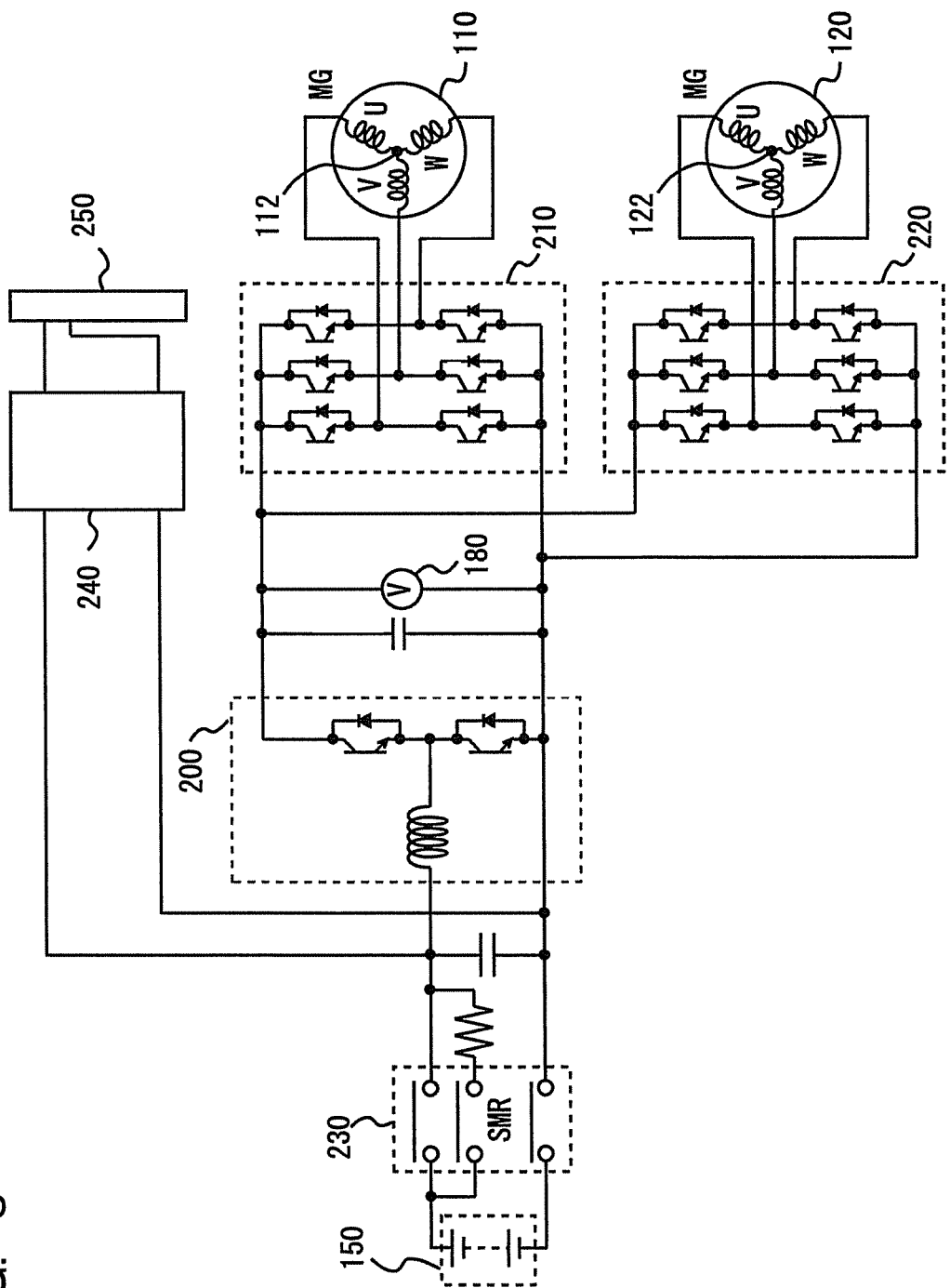
FIG. 6 is a first diagram showing an electrical system of the plug-in hybrid vehicle.

Referring to FIG. 6, the electrical system of the plug-in hybrid vehicle is further described. The plug-in hybrid vehicle is provided with a converter 200, a first inverter 210, a second inverter 220, a SMR (System Main Relay) 230, a charger 240, and an inlet 250.

Converter 200 includes a reactor, two npn transistors, and two diodes. The reactor has one end connected to the positive electrode side of each battery and has the other end connected to a node between the two npn transistors.

The two npn transistors are connected in series. The npn transistors are controlled by ECU 170. A diode is connected between the collector and the emitter of each npn transistor to allow current to flow from the emitter side to the collector side.

As the npn transistor, for example, an IGBT (Insulated Gate Bipolar Transistor) can be used. In place of the npn transistor, a power switching element such as a power MOSFET (Metal Oxide Semiconductor Field-Effect Transistor) can be used.

When electric power discharged from battery 150 is supplied to first motor generator 110 or second motor generator 120, the voltage is boosted by converter 200. Conversely, when electric power generated by first motor generator 110 or second motor generator 120 is supplied to charge battery 150, the voltage is decreased by converter 200.

A system voltage VH between converter 200 and each inverter is detected by a voltage sensor 180. The detection result from voltage sensor 180 is sent to ECU 170.

First inverter 210 includes a U-phase arm, a V-phase arm, and a W-phase arm. The U-phase arm, the V-phase arm, and the W-phase arm are connected in parallel. Each of the U-phase arm, the V-phase arm, and the W-phase arm has two npn transistors connected in series. A diode is connected between the collector and the emitter of each of the npn transistors to allow current to flow from the emitter side to the collector side. Then, the node between the npn transistors in each arm is connected to the end different from a neutral point 112 of each coil of first motor generator 110.

First inverter 210 converts direct current supplied from battery 150 into alternating current, and supplies the alternating current to first motor generator 110. First inverter 210 converts alternating current generated by first motor generator 110 into direct current.

Second inverter 220 includes a U-phase arm, a V-phase arm, and a W-phase arm. The U-phase arm, the V-phase arm, and the W-phase arm are connected in parallel. Each of the U-phase arm, the V-phase arm, and the W-phase arm has two npn transistors connected in series. A diode is connected between the collector and the emitter of each of the npn transistors to allow current to flow from the emitter side to the collector side. Then, the node between the npn transistors in each arm is connected to the end different from neutral point 122 of each coil of second motor generator 120.

Second inverter 220 converts direct current supplied from battery 150 into alternating current and supplies the alternating current to second motor generator 120. Second inverter 220 converts the alternating current generated by second motor generator 120 into direct current.

Converter 200, first inverter 210, and second inverter 220 are controlled by ECU 170.

SMR 230 is provided between battery 150 and charger 240. SMR 230 is a relay for switching between a state in which battery 150 and the electrical system are connected to each other and a state in which battery 150 and the electrical system are disconnected from each other. When SMR 230 is in an open state, battery 150 is disconnected from the electrical system. When SMR 230 is in a close state, battery 150 is connected to the electrical system.

In other words, when SMR 230 is in the open state, battery 150 is electrically disconnected from converter 200, charger 240, and the like. When SMR 230 is in the closed state, battery 150 is electrically connected to converter 200, charger 240, and the like.

The state of SMR 230 is controlled by ECU 170. For example, when ECU 170 is activated, SMR 230 is closed. When ECU 170 is stopped, SMR 230 is opened.

Figure 7:
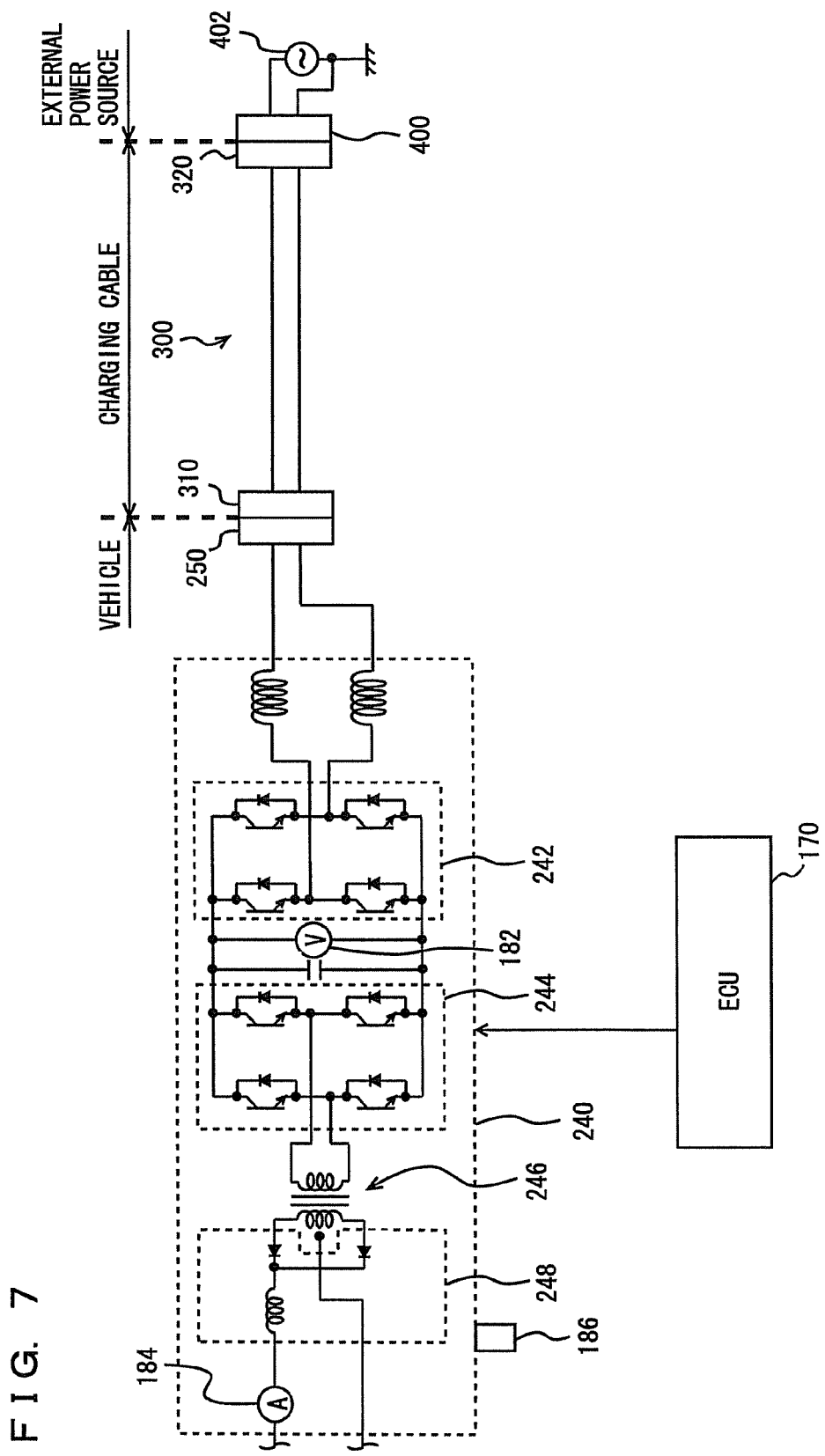
FIG. 7 is a second diagram showing the electrical system of the plug-in hybrid vehicle.

Charger 240 is connected between battery 150 and converter 200. As shown in FIG. 7, charger 240 includes an AC/DC converter circuit 242, a DC/AC converter circuit 244, an insulated transformer 246, and a rectifier circuit 248.

AC/DC converter circuit 242 is formed of a single-phase bridge circuit. AC/DC converter circuit 242 converts AC (alternating current) power into DC (direct current) power based on a drive signal from ECU 170. AC/DC converter circuit 242 also functions as a boost chopper circuit which boosts voltage by using a coil as a reactor.

DC/AC converter circuit 244 is formed of a single-phase bridge circuit. DC/AC converter circuit 244 converts DC power into high-frequency AC power based on a drive signal from ECU 170 and outputs the AC power to isolation transformer 246.

Isolation transformer 246 includes a core made of a magnetic material, and a primary coil and a secondary coil wound around the core. The primary coil and the secondary coil are electrically isolated from each other and connected to DC/AC converter circuit 244 and rectifier circuit 248, respectively. Isolation transformer 246 transforms the high-frequency AC power received from DC/AC converter circuit 244 into a voltage level corresponding to a turns ratio between the primary coil and the secondary coil, and outputs the transformed AC power to rectifier circuit 248. Rectifier circuit 248 rectifies the AC power output from isolation transformer 246 into DC power.

Voltage between AC/DC converter circuit 242 and DC/AC converter circuit 244 (terminal-to-terminal voltage of a smoothing capacitor) is detected by a voltage sensor 182, and a signal representing the detection result is input to ECU 170. Output current of charger 240 is detected by a current sensor 184, and a signal representing the detection result is input to ECU 170. Furthermore, the temperature of charger 240 is detected by a temperature sensor 186, and a signal representing the detection result is input to ECU 170.

Inlet 250 is provided in, for example, a side portion of the plug-in hybrid vehicle. A connector 310 of a charging cable 300 is connected to inlet 250 so as to couple the plug-in hybrid vehicle and an external power source 402 to each other.

Charging cable 300 has a plug 320 connected to a receptacle 400 provided in a house. Receptacle 400 is supplied with AC power from power source 402 external to the plug-in hybrid vehicle.

When the plug-in hybrid vehicle and external power source 402 are coupled to each other by charging cable 300, battery 150 is charged with electric power supplied from external power source 402. During the charging of battery 150, SMR 230 is closed.

Figure 8:
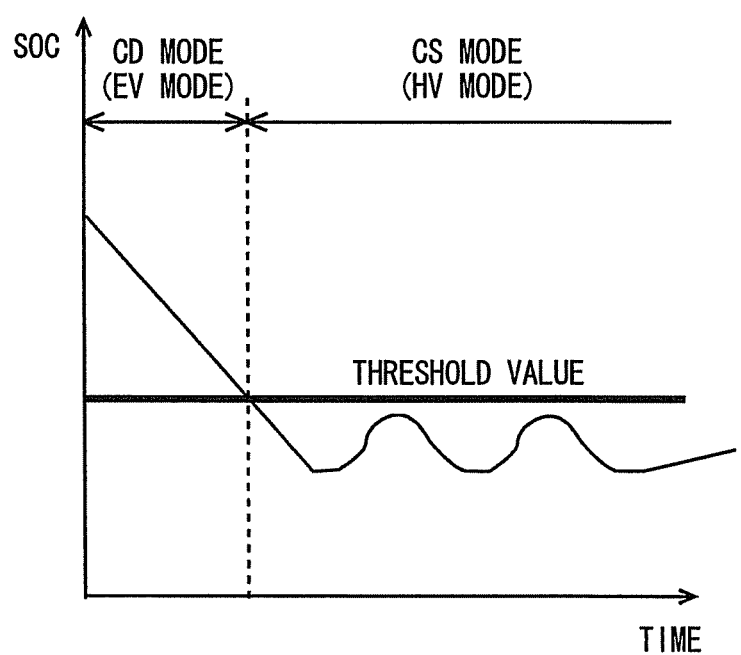
FIG. 8 shows a region in which a CS mode is selected and a region in which a CD mode is selected.

Referring to FIG. 8, the following further describes the CS mode and the CD mode. ECU 170 determines which one of the CS mode and the CD mode is to be selected. For example, if SOC of battery 150 is equal to or smaller than a threshold value, the CS mode is selected. If SOC of battery 150 is greater than the threshold value, the CD mode is selected.

More specifically, the CS mode is selected when SOC of battery 150 is equal to or smaller than the threshold value, or when the electrical system of the plug-in hybrid vehicle has been stopped last time in a state in which the CS mode is selected.

The CD mode is selected when SOC of battery 150 is greater than the threshold value and there exists a history of charging battery 150 by power source 402 external to the plug-in hybrid vehicle, or when SOC of battery 150 is greater than the threshold value and the electrical system of the plug-in hybrid vehicle has been stopped last time in a state in which the CD mode is selected. Since charging of battery 150 is controlled by ECU 170, whether there exists a history of charging battery 150 by power source 402 external to the plug-in hybrid vehicle is determined inside ECU 170 using, for example, a flag. It should be noted that the way to select the CS mode and the CD mode is not limited thereto.

In the CS mode and the CD mode, the plug-in hybrid vehicle travels using the driving force from at least one of engine 100 and second motor generator 120.

Figure 9:
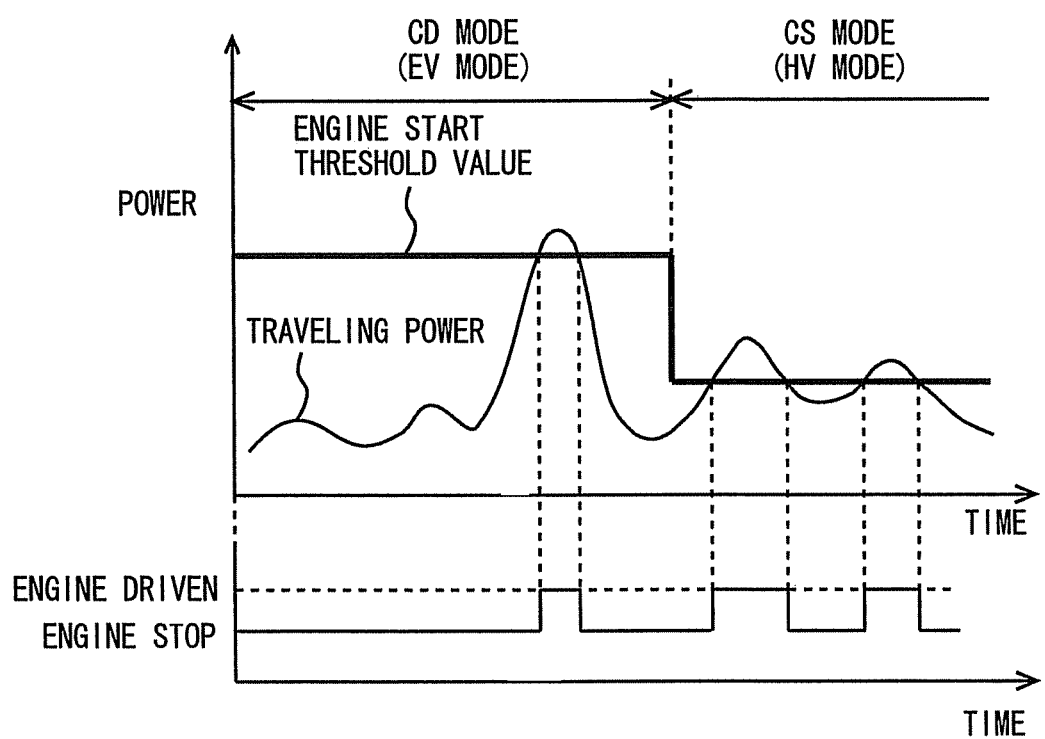
FIG. 9 shows a period during which the engine is driven.

As shown in FIG. 9, when the traveling power of the plug-in hybrid vehicle is smaller than an engine start threshold value, the plug-in hybrid vehicle travels only using the driving force of second motor generator 120. Hence, when the traveling power equal to or greater than the engine start threshold value is decreased to the engine start threshold value, ignition and supply of fuel to engine 100 (fuel injection) are suspended to stop engine 100.

When the traveling power of the plug-in hybrid vehicle reaches or exceeds the engine start threshold value, engine 100 is driven. Accordingly, the plug-in hybrid vehicle travels using the driving force of engine 100 in addition to or instead of the driving force of second motor generator 120. Further, the electric power generated by first motor generator 110 using the driving force of engine 100 is directly supplied to second motor generator 120.

As is clear from FIG. 9, the region in which the plug-in hybrid vehicle is controlled in the CS mode includes a region in which engine 100 is stopped and a region in which engine 100 is driven. Similarly, the region in which the plug-in hybrid vehicle is controlled in the CD mode includes a region in which engine 100 is stopped and a region in which engine 100 is driven.

The traveling power is calculated by ECU 170, for example, in accordance with a map having the opening degree of the accelerator pedal operated by the driver (accelerator position), the vehicle speed, and the like as parameters. It should be noted that the way to calculate the traveling power is not limited thereto.

In the present embodiment, the traveling power is used as a parameter of the plug-in hybrid vehicle that is determined in accordance with the driver's operation. It should be noted that torque, acceleration, driving force, accelerator position, or the like may be used as a parameter of the plug-in hybrid vehicle.

The engine start threshold value in the CD mode is greater than the engine start threshold value in the CS mode. More specifically, the region in which engine 100 stops and the plug-in hybrid vehicle travels only with the driving force of second motor generator 120 in the CD mode is larger than the region in which engine 100 stops and the plug-in hybrid vehicle travels only with the driving force of second motor generator 120 in the CS mode. Therefore, in the CD mode, control is such that engine 100 is stopped and the plug-in hybrid vehicle mainly travels only with the driving force of second motor generator 120. On the other hand, in the CS mode, engine 100 is driven more frequently than that in the CD mode. Therefore, in the CS mode, control is such that the plug-in hybrid vehicle travels efficiently using both of engine 100 and second motor generator 120.

In the following, the engine start threshold value in the CS mode is also referred to as a first engine starting power. The engine start threshold value in the CD mode is also referred to as a second engine starting power.

The electric power charged in battery 150 in the CD mode is set smaller than the electric power charged in battery 150 in the CS mode. Specifically, in the CS mode, charging power to battery 150 is set in accordance with SOC of battery 150. Engine 100 is driven such that electric power corresponding to the set charging power can be generated using first motor generator 110. On the other hand, in the CD mode, the charging power to battery 150 is usually set to zero. In other words, in the CD mode, battery 150 is charged with electric power obtained by regenerative braking, but engine 100 is not driven for the purpose of charging battery 150.

Therefore, in the CD mode, electric power stored in battery 150, in particular, electric power supplied from power source 402 external to the plug-in hybrid vehicle is actively consumed. As a result, in the CD mode, as compared with the CS mode, ignition and supply of fuel to engine 100 (fuel injection) can be frequently suspended to stop engine 100. In other words, in the CD mode, as compared with the CS mode, a chance of operation of engine 100 is restricted. Accordingly, even when engine 100 is started, the engine may be stopped before completing warming-up of the engine. As a result, the engine may be restarted frequently when the warming-up is not completed. As known well, if engine 100 is started when the warming-up is not completed, a relatively large amount of HC or CO can be emitted. In order to reduce the amount of emission of HC or CO, in the present embodiment, when the ignition and the supply of fuel are stopped at time t1 to stop engine 100 in the CD mode, ECU 170 drives first motor generator 110 until time t2 as shown in FIG. 10, thereby rotating output shaft 108 of engine 100. More specifically, when the coolant of engine 100 has a temperature equal to or smaller than a predetermined threshold value after the suspension of the ignition and supply of fuel in the CD mode, ECU 170 drives first motor generator 110 with the ignition and supply of fuel being suspended, thereby rotating output shaft 108 of engine 100. The threshold value is, for example, a temperature considered as a temperature at which the warming-up of engine 100 has been completed.

With the rotation of output shaft 108 of engine 100, new air is introduced into the combustion chamber and the exhaust passage of engine 100. Hence, catalyst 102 in each of the combustion chamber and the exhaust passage is cleaned. As a result, HC or CO, which may be emitted when restarting engine 100, is reduced.

Figure 11:
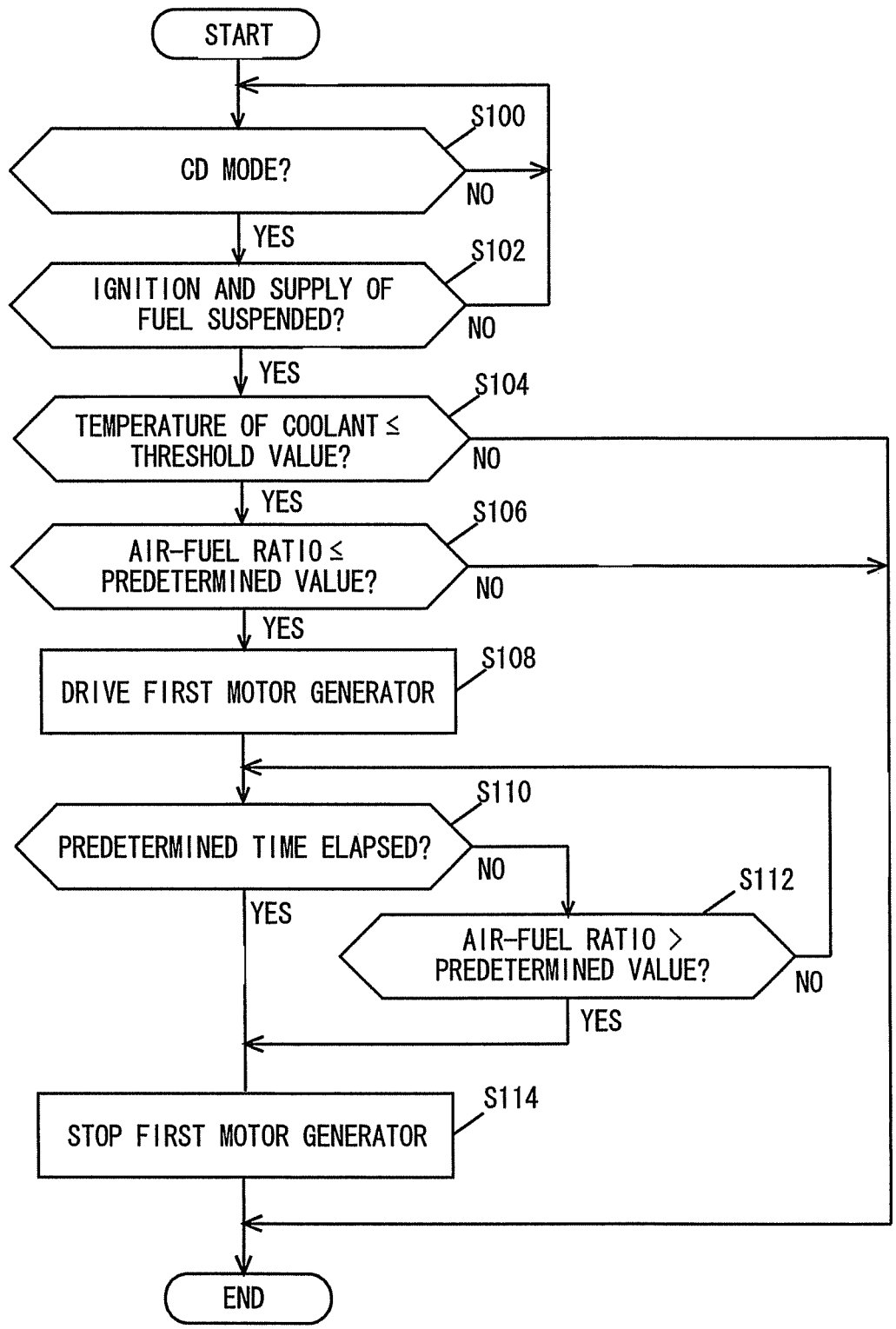
FIG. 11 is a flowchart showing processes performed by an ECU.

Referring to FIG. 11, the following describes a control structure of the processes performed by ECU 170.

In a step (hereinafter, the term "step" will be abbreviated as "S") 100, it is determined whether or not the plug-in hybrid vehicle is controlled in the CD mode. When the plug-in hybrid vehicle is controlled in the CD mode (YES in S100), it is determined in S102 whether or not ignition and supply of fuel to engine 100 have been suspended to stop engine 100.

When the temperature of the coolant of engine 100 is greater than the predetermined threshold value (NO in S104) or the air-fuel ratio is greater than the predetermined value, for example, is greater than the stoichiometric air-fuel ratio (NO in S106) after suspending the ignition and supply of fuel to engine 100, first motor generator 110 is not driven.

On the other hand, when the temperature of the coolant of engine 100 is equal to or smaller than the predetermined threshold value (YES in S104) and the air-fuel ratio is equal to or smaller than the predetermined value, for example, is equal to or smaller than the stoichiometric air-fuel ratio (YES in S106) after suspending the ignition and supply of fuel to engine 100, first motor generator 110 is driven in S108 with the suspension of the ignition and supply of fuel being maintained, thereby rotating output shaft 108 of engine 100.

When a predetermined time, for example, approximately 4 seconds has elapsed (YES in S110) or when the air-fuel ratio has become greater than the predetermined value, for example, the stoichiometric air-fuel ratio (YES in S112) after starting to drive first motor generator 110 to rotate output shaft 108 of engine 100, the driving of first motor generator 110 is stopped in S112.

The embodiments disclosed herein are illustrative and non-restrictive in any respect. The scope of the present invention is defined by the terms of the claims, rather than the embodiments described above, and is intended to include any modifications within the scope and meaning equivalent to the terms of the claims.

REFERENCE SIGNS LIST

100: engine; 102: catalyst; 104: air-fuel ratio sensor; 106: temperature sensor; 108: output shaft; 110: first motor generator; 120: second motor generator; 130: power split device; 140: speed reducer; 150: battery; 160: front wheel; 170: ECU.

The invention claimed is:

1. A vehicle comprising:
an internal combustion engine;
an electric motor coupled to an output shaft of said internal combustion engine;
a control unit that suspends ignition and supply of fuel to said internal combustion engine, and that thereafter causes rotation of the output shaft of said internal combustion engine by driving said electric motor with the suspension of the ignition and supply of fuel being maintained when a temperature of coolant of said internal combustion engine is equal to or smaller than a predetermined threshold value; and
wherein said control unit controls said internal combustion engine in one of a first mode and a second mode in which a chance of operation of said internal combustion engine is restricted as compared with said first mode, and
in said second mode, said control unit causes rotation of the output shaft of said internal combustion engine by driving said electric motor when the temperature of the coolant of said internal combustion engine is equal to or smaller than the predetermined threshold value after suspending the ignition and supply of fuel to said internal combustion engine.

2. The vehicle according to claim 1, wherein
said control unit controls said internal combustion engine in one of a first mode in which the vehicle travels while maintaining electric power, which is stored in a battery, at a predetermined target value and a second mode in which the vehicle travels without maintaining the electric power stored in said battery, and
in said second mode, said control unit causes rotation of the output shaft of said internal combustion engine by driving said electric motor when the temperature of the coolant of said internal combustion engine is equal to or smaller than the predetermined threshold value after suspending the ignition and supply of fuel to said internal combustion engine.

3. The vehicle according to claim 1, wherein said control unit sets a parameter of
said vehicle in accordance with an operation of a driver,
in said first mode, said control unit suspends the ignition and supply of fuel to said internal combustion engine when said parameter is smaller than a predetermined first value, and said control unit drives said internal combustion engine when said parameter is equal to or greater than said first value, and
in said second mode, said control unit suspends the ignition and supply of fuel to said internal combustion engine when said parameter is smaller than a second value greater than said first value, and said control unit drives said internal combustion engine when said parameter is equal to or greater than said second value.

4. The vehicle according to claim 3, wherein said parameter is power.

5. The vehicle according to claim 1, wherein said control unit controls said internal combustion engine in said first mode when a power storage device has a state of charge equal to or smaller than a threshold value, and said control unit controls said internal combustion engine in said second mode when said power storage device has a state of charge greater than said threshold value.

6. A method for controlling a vehicle equipped with an internal combustion engine and an electric motor coupled to an output shaft of said internal combustion engine, comprising the steps of:
   suspending ignition and supply of fuel to said internal combustion engine; and
   controlling said internal combustion engine in one of a first mode and a second mode in which a chance of operation of said internal combustion engine is restricted as compared with said first mode, and
   rotating, in said second mode, the output shaft of said internal combustion engine by driving said electric motor with the suspension of the ignition and supply of fuel being maintained when a temperature of coolant of said internal combustion engine is equal to or smaller than a predetermined threshold value after suspending the ignition and supply of fuel to said internal combustion engine.

7. A device for controlling a vehicle equipped with an internal combustion engine and an electric motor coupled to an output shaft of said internal combustion engine, comprising:
   means for suspending ignition and supply of fuel to said internal combustion engine;
   means for controlling said internal combustion engine in one of a first mode and a second mode in which a chance of operation of said internal combustion engine is restricted as compared with said first mode, and
   means for rotating, in said second mode, the output shaft of said internal combustion engine by driving said electric motor with the suspension of the ignition and supply of fuel being maintained when a temperature of coolant of said internal combustion engine is equal to or smaller than a predetermined threshold value after suspending the ignition and supply of fuel to said internal combustion engine.

8. The vehicle according to claim 2, wherein
   said control unit sets a parameter of said vehicle in accordance with an operation of a driver,
   in said first mode, said control unit suspends the ignition and supply of fuel to said internal combustion engine when said parameter is smaller than a predetermined first value, and said control unit drives said internal combustion engine when said parameter is equal to or greater than said first value, and
   in said second mode, said control unit suspends the ignition and supply of fuel to said internal combustion engine when said parameter is smaller than a second value greater than said first value, and said control unit drives said internal combustion engine when said parameter is equal to or greater than said second value.

9. The vehicle according to claim 2, wherein said control unit controls said internal combustion engine in said first mode when a power storage device has a state of charge equal to or smaller than a threshold value, and said control unit controls said internal combustion engine in said second mode when said power storage device has a state of charge greater than said threshold value.

10. The vehicle according to claim 8, wherein said parameter is power.

11. The vehicle according to claim 1, wherein
    said control unit causes rotation of the output shaft of said internal combustion engine by driving said electric motor with the suspension of the ignition and supply of fuel being maintained when said temperature of coolant of said internal combustion engine is equal to or smaller than said predetermined threshold value and an air-fuel ratio of said internal combustion engine is equal to or smaller than a predetermined value.

12. The method for controlling a vehicle according to claim 6, wherein
    said step of rotating includes the step of rotating the output shaft (108) of said internal combustion engine by driving said electric motor when said temperature of coolant of said internal combustion engine is equal to or smaller than said predetermined threshold value and an air-fuel ratio of said internal combustion engine is equal to or smaller than a predetermined value, after suspending the ignition and supply of fuel to said internal combustion engine.

13. The device for controlling a vehicle according to claim 7, wherein
    said output shaft of said internal combustion engine is rotated by driving said electric motor when said temperature of coolant of said internal combustion engine is equal to or smaller than said predetermined threshold value and an air-fuel ratio of said internal combustion engine is equal to or smaller than a predetermined value, after suspending the ignition and supply of fuel to said internal combustion engine.

* * * * *